US008378791B2

(12) United States Patent
Ito et al.

(10) Patent No.: US 8,378,791 B2
(45) Date of Patent: Feb. 19, 2013

(54) IMAGE REPRODUCTION SYSTEM AND SIGNAL PROCESSOR USED FOR THE SAME

(75) Inventors: Kazunari Ito, Osaka (JP); Yasuhiro Miyata, Osaka (JP); Masanori Shigematsu, Osaka (JP); Hideki Ohkita, Tokyo (JP); Akira Miyazawa, Tokyo (JP); Tomoaki Nakade, Tokyo (JP)

(73) Assignees: Onkyo Corporation, Osaka (JP); Kabushiki Kaisha Toshiba, Tokyo (JP)

( * ) Notice: Subject to any disclaimer, the term of this patent is extended or adjusted under 35 U.S.C. 154(b) by 1387 days.

(21) Appl. No.: 12/074,450

(22) Filed: Mar. 4, 2008

(65) Prior Publication Data
US 2008/0244649 A1 Oct. 2, 2008

(30) Foreign Application Priority Data

Mar. 28, 2007 (JP) ................................ 2007-083986

(51) Int. Cl.
*G08C 19/16* (2006.01)

(52) U.S. Cl. .................................................. 340/12.29
(58) Field of Classification Search ............... 340/12.29, 340/3.1, 5.1; 345/173; 342/179, 191, 195
See application file for complete search history.

(56) References Cited

U.S. PATENT DOCUMENTS

| 8,027,559 | B2 * | 9/2011 | Nakazawa | .................... 386/200 |
| 2004/0143847 | A1 | 7/2004 | Suzuki et al. | |
| 2005/0262535 | A1 * | 11/2005 | Uchida et al. | ................... 725/80 |
| 2007/0024462 | A1 | 2/2007 | Kitaura | |
| 2007/0220150 | A1 * | 9/2007 | Garg | ............................. 709/226 |

FOREIGN PATENT DOCUMENTS

| JP | 2002-140155 | 5/2002 |
| JP | 2003-298975 | 10/2003 |
| JP | 2004-208920 | 7/2004 |
| JP | 2006-108750 | 4/2006 |
| JP | 2007-36854 | 2/2007 |
| JP | 2007-036906 | 2/2007 |
| JP | 2008-34976 | 2/2008 |

\* cited by examiner

*Primary Examiner* — Vernal Brown
(74) *Attorney, Agent, or Firm* — Hamre, Schumann, Mueller & Larson, P.C.

(57) ABSTRACT

An image reproduction system includes a TV set, an AV amplifier connected to the TV set, and a plurality of image output devices, such as a DVD player, a set-top box and a game console, connected to the AV amplifier. The ID information of these image output devices is displayed as a list on the screen of the TV set. The user can select any one of the image output devices from the list by using a remote control, for example. The fact of the selection is transmitted to the AV amplifier from the TV set. Upon this, the AV amplifier connects the selected image output device to the TV set, so that the image signals reproduced by the selected device are sent to the TV set.

6 Claims, 12 Drawing Sheets

IMAGE REPRODUCTION SYSTEM AND SIGNAL PROCESSOR USED FOR THE SAME

BACKGROUND OF THE INVENTION

1. Field of the Invention

The present invention relates to an image reproduction system comprising a signal processor (AV amplifier), a television set and so on.

2. Description of the Related Art

In recent years, the use of home theater systems is widespread among the general public, in which a plurality of speakers are set around the user to provide different but cooperative sounds, thereby giving the user the feeling of being at alive performance (see JP-A-2003-298975, for example). A typical home theater system includes a television set, an AV amplifier connected to the TV set, a plurality of external speakers connected to the amplifier, and a source unit such as a DVD (digital versatile disc) player connected to the amplifier.

As for the so-called AV (audio/visual) equipment such as an AV amplifier constituting the home theater system, types which conform to HDMI (High Definition Multimedia Interface), a digital input/output standard for image signals and audio signals, have been proposed. The equipment conforming to HDMI is connected by an HDMI cable for transmitting and receiving image signals, audio signals and control signals through the HDMI cable.

The television set may include a display panel such as a liquid crystal display or a plasma display. Image signals to be reproduced by a DVD player are inputted via an AV amplifier and outputted to the display panel. Generally, a television set has a tuner incorporated for receiving television broadcasting. The television set may be provided with a composite terminal or an S (separate) terminal for connection to e.g. a VHS (video home system) equipment and with a component terminal for transmitting component image signals. When the television set conforms to HDMI, an HDMI input terminal is also provided.

In displaying an image by the television set of such an image reproduction system, in addition to television broadcasting, the user can select one of the image signal sources (hereinafter referred to as "input sources") connected to the input terminal. On the display screen of the television set, as shown in FIG. 13, an input selection list for enabling the user to select an input source is displayed. Specifically, the input selection screen includes "television broadcasting", "composite input", "S terminal input", "component input", "HDMI input 1" and "HDMI input 2", which are the names of the input sources which can be dealt with by the television set.

The user can select a desired one from the displayed input sources by e.g. moving a cursor using a remote control for the television set. Specifically, when a video apparatus conforming to the S-VHS standard is connected to the S terminal input and the user wants to reproduce images from the video apparatus, the user operates the remote controller to select the "S terminal input".

The AV amplifier may include an input terminal for a set-top box for receiving cable television services, a game input terminal for connecting a game console and an HDMI input terminal for connecting e.g. a DVD player.

The above image reproduction system has the following problems. When an AV amplifier is connected to the HDMI input terminal and a DVD player is connected to the AV amplifier, the user has to perform a troublesome operation to reproduce the image from the DVD player on the television set.

For instance, when the user wants to select the "DVD player" among all the input sources, the user first needs to select nothing but the "HDMI input 1" from the items of the above-described input selection list by using the remote control, because the "HDMI input 1", not the "DVD player", shows on the display screen.

Thereafter, the user may further need to select the "DVD player" as the input source by using the remote control for the AV amplifier, since the input source is not necessarily switched to the "DVD player" at the AV amplifier.

In the conventional system, as described above, when the user wants to select the DVD player, the user needs to perform the troublesome operations to select the HDMI input terminal at the television set and select the DVD player at the AV amplifier.

SUMMARY OF THE INVENTION

The present invention has been proposed under the above-described circumstances. It is therefore an object of the present invention to provide an image reproduction system in which the user can easily select an input source among a plurality of AV units.

According to the present invention, there is provided an image reproduction system comprising a display device, a signal processor, and a plurality of image output devices. The display device includes: a display panel; a list display controller for causing the display panel to display a list of image signal output sources; an operation input section for enabling a user to select one of the image signal output sources displayed on the display panel; and a display output section for outputting an image signal of the selected one of the image signal output sources to the display panel. The signal processor, connected to the display device, includes a plurality of specific input terminals and a signal output section for outputting image signals inputted through the specific input terminals to the display device. The image output devices, each connected to one of the specific input terminals of the signal processor, are configured to output image signals to the signal processor. In this system, the display device further includes: a display change section for adding ID information of the respective image output devices to the list displayed on the display panel; and a selection information transmitting section for transmitting selection information to the signal processor when one of the image output devices is selected by the operation input section. The signal processor further includes: a device information transmitting section for transmitting ID information of the respective image output devices to the display device; and a switching section for outputting image signals from the selected one of the image output devices to the display device upon receiving the selection information transmitted by the selection information transmitting section.

The image reproduction system of the present invention may further comprise HDMI cables for connecting between the display device and the signal processor and for connecting between the signal processor and the respective image output devices, where the display device, the signal processor and the image output devices conform to HDMI. As noted above, HDMI stands for High Definition Multimedia Interface.

The selection information transmitted by the selection information transmitting section and the ID information of the image output devices transmitted by the device information transmitting section may be sent via CEC control lines included in the HDMI cables.

According to the present invention, the signal processor (e.g. AV amplifier) transmits ID information about the image output device (e.g. DVD player) connected to the plurality of specific input terminals to the display device (e.g. television set). The display device adds, as the image signal output source, the information about the image output device outputted from the signal processor to the list displayed on the screen of the display device. When one of the image output devices is selected by the user, the content (i.e. the fact that one of the image output devices has been selected) is transmitted to the signal processor. Based on the content transmitted from the display, the signal processor switches the image signal output channel to the display device for the image signal from the selected image output device.

Conventionally, only the names of the input terminals are displayed as a list on the selection display screen of the display device, and the ID information (typically, the name) of the image output devices connected to the signal processor is not displayed. Thus, to select an image output device using the selection display screen, it has been necessary to first select the input terminal to which the signal processor is connected at the display and then select the image output device at the signal processor.

According to the present invention, however, the names of all the image output devices connected to the signal processor are displayed at the selection display screen. Thus, the user can select the desired image output device only by the operation at the display device. The content of selection is transmitted to the signal processor, and the image signals of the image output device switched automatically on the side of the signal processor are transmitted to the display device. In this manner, it is unnecessary for the user to additionally select the image output device on the side of the signal processor.

Other features and advantages of the present invention will become more apparent from the detailed description given below with reference to the accompanying drawings.

DETAILED DESCRIPTION OF THE PREFERRED EMBODIMENTS

Preferred embodiments of the present invention will be described below with reference to the accompanying drawings.

Figure 1:
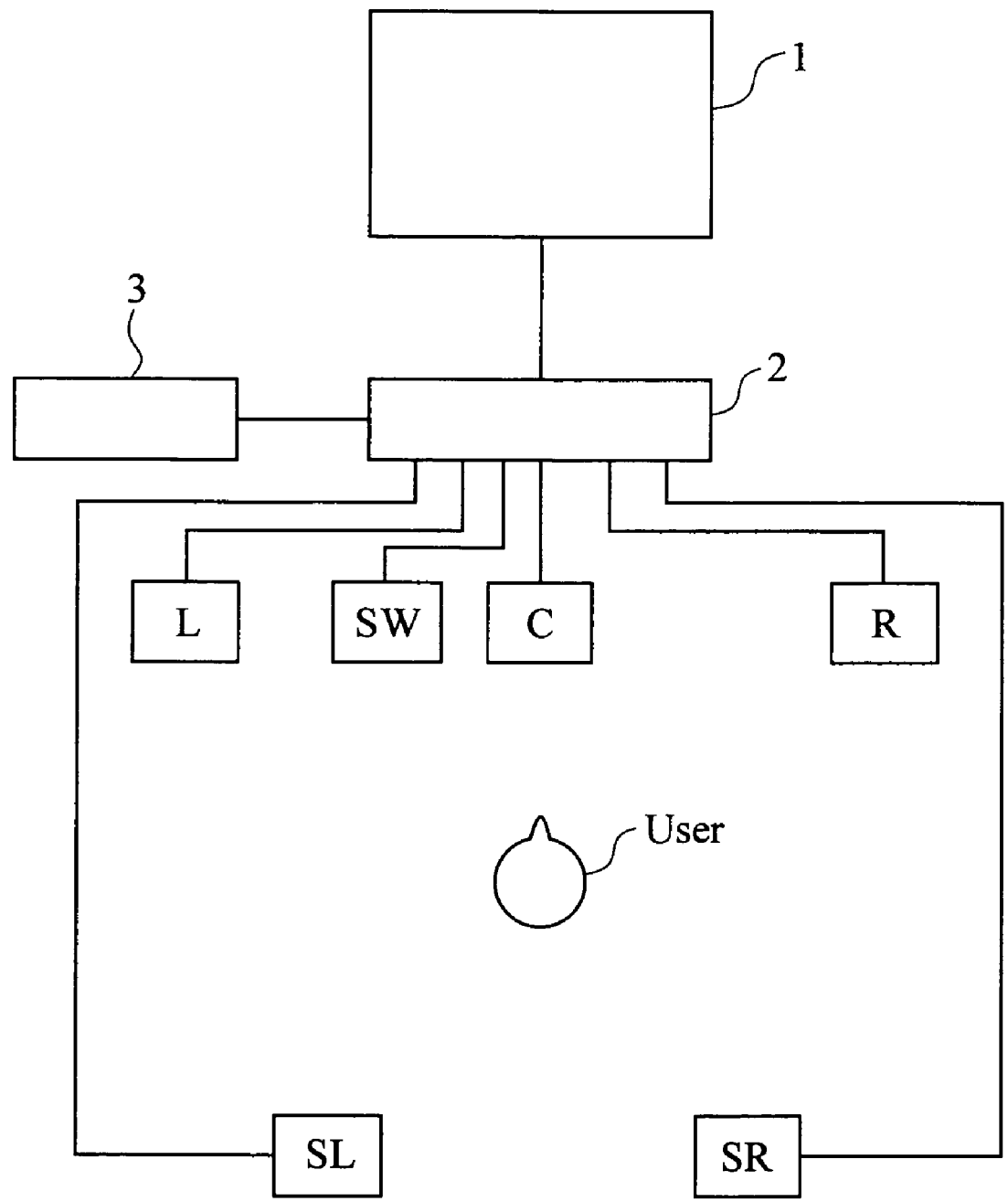
FIG. 1 shows the structure of a home theater system to which an image reproduction system according to the present invention is applied.

FIG. 1 shows the structure of a home theater system to which the image reproduction system according to the present invention is applied.

The home theater system is designed to provide a sound field with excellent presence by arranging a plurality of speakers around the user in e.g. a room and outputting different sounds from the speakers. The home theater system includes a television set 1, an AV amplifier 2 (which may be called "multi-channel amplifier" or "AV receiver") connected to the TV set, a DVD (digital versatile disc) player 3 and a plurality of speakers connected to the amplifier 2.

The number of the speakers corresponds to the number of channels such as "5.1 channel" or "7.1 channel". For instance, in a 5.1 channel home theater system, three front speakers L, R and C are arranged on the left, on the right and at the center in front of the user, a subwoofer SW is arranged at the center in front of the user, and two surround speakers SL and SR are arranged on the left and right behind the user. Clearly, the number of speakers of the home theater system is not limited to the above instance.

Figure 2:
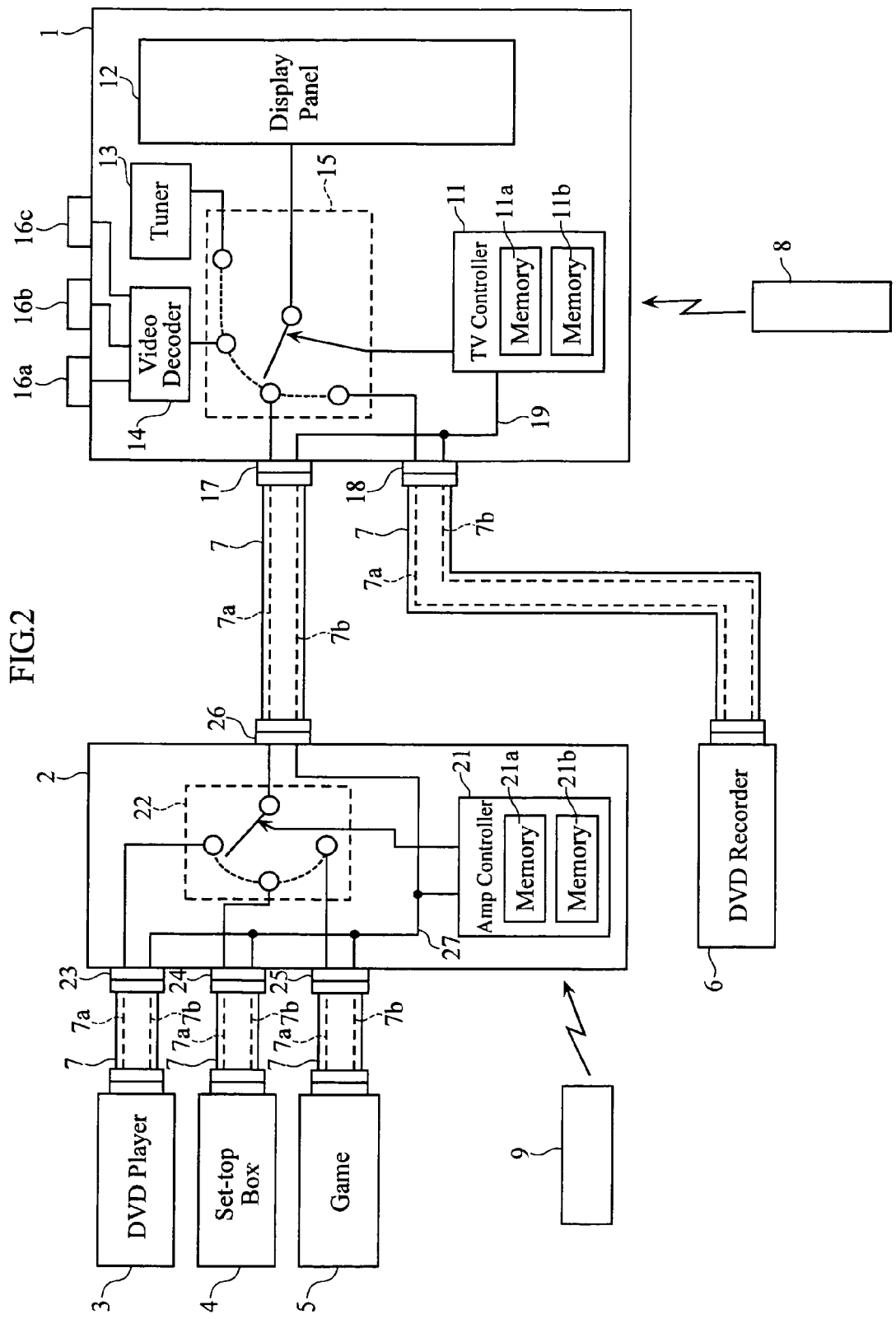
FIG. 2 shows the structure of an image reproduction system according to the present invention.

FIG. 2 illustrates an image reproduction system according to the present invention, which is applied to the home theater system shown in FIG. 1. FIG. 2 shows only the structure of each apparatus which is related to this embodiment and does not show the entirety of each apparatus.

The image reproduction system comprises AV (audio/visual) equipment for the home theater system. Specifically, the image reproduction system comprises a television set 1 as a display, an AV amplifier 2 as a signal processor connected to the TV set, a DVD player 3, a set-top box 4 and a game console 5 as image output devices connected to the AV amplifier, and a DVD recorder 6 connected to the television set 1. The DVD player 3, the set-top box 4 and the game console 5 are merely examples as image output devices, and other AV units may be used for the system.

The AV units mentioned above conform to HDMI (High Definition Multimedia Interface) which is a digital input/output standard for image signals and audio signals. In this image reproduction system, in the direction in which image signals and audio signals are transmitted, the DVD player 3, the set-top box 4 and the game console 5 are arranged on the upstream side, whereas the television set 1 is arranged on the downstream side. According to HDMI, the AV equipment located on the most downstream side like the television set 1 is called a "sink device", the AV equipment located on the most upstream side like the DVD player 3, the set-top box 4 and the game console 5 is called a "source device", and the AV equipment located at an intermediate position in the tree structure like the AV amplifier 2 is called a "repeater device".

The television set 1 includes e.g. a liquid crystal display panel or a plasma panel for displaying images based on the inputted image signals. The television set 1 comprises a television controller 11, a display 12, a tuner circuit 13, a video decoder 14 and a switching circuit 15.

The television controller 11 comprises a non-illustrated microcomputer, and collectively controls the display 12, the tuner circuit 13, the video decoder 14 and the switching circuit 15. An operation portion (not shown) as a man-machine interface is connected to the television controller 11. The television controller 11 performs data processing based on the input operation of the user via the operation portion or based on control signals or data supplied from predetermined parts.

The television controller 11 includes a first memory 11a and a second memory 11b. The memory 11a stores EDID (Extended Display Identification Data) indicating e.g. the display performance or audio performance of the television set 1. For instance, the EDID may be information such as the physical address of the television set 1, the kind of resolution of the image data which can be processed by the television set 1. The EDID is read by the AV amplifier 2, which is an upstream equipment of the TV set 1.

The display 12 may comprise a liquid crystal display panel or a plasma display panel, for example.

The tuner circuit 13 is a circuit for receiving television broadcasting. Though not illustrated, the tuner circuit 13 is connected, via an external terminal, to an antenna installed on e.g. the roof of a house.

The video decoder 14 is a circuit for processing image signals (analog signals) inputted from a specific external input terminal and for outputting the signals to the display 12.

The television set 1 is provided with external input terminals such as a composite terminal 16a for connection to e.g. a VHS (video home system) equipment, an S (separate) terminal 16b for connection to the VHS equipment and separating a luminance signal and a color signal, and a component terminal 16c for connection to equipment handling component image signals to transmit the component image signals. The video decoder 14 decodes the image signals inputted from the composite terminal 16a, the S terminal 16b and the component terminal 16c.

The television set 1 is further provided with a first HDMI input terminal 17 and a second HDMI input terminal 18 for connection to other AV equipment conforming to HDMI. The number of the HDMI input terminals provided at the television set 1 is not limited to two.

The memory 11b stores the names of the external input terminals and image signal sources including television broadcasting (hereinafter, all of these are referred to as "input sources"), while also storing specific source numbers corresponding to the input sources, all being stored in the form of an input source table 1 as shown below. The input source table is used for displaying, on the display 12, the input selection list (see FIG. 3) for selecting the input source of the image to be displayed on the display 12 based on the input operation of the user.

TABLE 1

| Input Source Name | Source No. |
| --- | --- |
| Television Broadcasting | 1 |
| Composite Input | 2 |
| S terminal Input | 3 |
| Component Input | 4 |
| HDMI Input 1 | 5 |
| HDMI Input 2 | 6 |

The input source table, as shown above, stores source numbers determined in a prescribed manner. Specifically, the source number for the "television broadcasting" as the input source supplied through the tuner circuit 13 is set to be "1", the source number for the "composite input" as the input source supplied through the composite terminal 16a is "2", the source number for the "S terminal input" as the input source supplied through the S terminal 16b is "3", the source number for the "component input" as the input source supplied through the component terminal 16c is "4" and so on.

As will be described later, source numbers in connection with the first and the second HDMI input terminals 17 and 18 are set in view of the physical addresses of the AV equipments to be connected to the HDMI input terminal 17 or 18. For instance, in the illustrated image reproduction system, the source number for the "HDMI input 1", which is an input source connected via the first HDMI input terminal 17 is "5" and the source number for the "HDMI input 2", which is an input source connected via the second HDMI input terminal 2 is "6".

In this image reproduction system, the AV amplifier 2 is connected to the first HDMI input terminal 17, whereas the DVD recorder 6 is connected to the second HDMI input terminal 18. For connecting the television set 1 AV equipments via the first or second HDMI input terminal 17, 18, use is made of an HDMI cable 7 designed specially for the HDMI terminal.

The HDMI cable 7 allows transmission and reception of image signals, audio signals and control signals between the AV equipment connected via the cable. The HDMI cable 7 comprises a plurality of signal lines corresponding to the pin-out of the HDMI terminal.

For instance, the HDMI terminal may have a pin-out consisting of 19 pins. A specific number is assigned to each of the pins, and the kind of signals to be transmitted through the pin is determined in advance. For instance, image signals and audio signals are transmitted through the 1st through the 12th pins. The commands by the CEC (consumer electronics control), data and so on are transmitted through the 13th pin. Hot plug signals are transmitted through the 19th pin.

As shown in FIG. 2, the HDMI cable 7 includes image signal lines 7a correspondingly to the 1st through the 12th pins. (Though a single signal line is shown in FIG. 2, the actual configuration includes more than one signal line.) The HDMI cable 7 includes a CEC control line 7b correspondingly to the 13th pin. Though not illustrated, the HDMI cable 7 further includes a hot plug signal line correspondingly to the 19th pin.

Herein, the "CEC" implies the function to enable a plurality of AV equipment to control each other by transmitting a predetermined command (hereinafter referred to as "CEC command") through the CEC control line 7b included in the HDMI cable 7. According to the CEC, AV equipment providing companies can make arbitrary commands for controlling a plurality of AV equipments.

The hot plug signals are signals for detecting whether or not the counterpart AV equipment connected via the HDMI cable 7 is in operation and EDID is ready to be read. Though not illustrated, the television controller 11 is connected to the first and the second HDMI input terminals 17, 18 via hot plug signal lines.

The television controller 11 can change the logic level of the hot plug signal to be supplied to the hot plug signal line so that the counterpart AV equipment connected thereto can detect whether or not the television set 1 is in operation and EDID is ready to be read. Specifically, when the television set 1 is in operation and EDID is ready to be read, the television controller 11 changes the hot plug signal to the H (high) level. When the television set 1 is not in operation or the EDID is not ready to be read, the television controller changes the hot plug signal to the L (low) level.

The television set 1 is provided with a CEC bus 19 for connecting the CEC terminals of the first and the second HDMI input terminals 17 and 18 to each other and connecting the terminals to the television controller 11. Thus, the television controller 11 recognizes the information of CEC at each of the HDMI input terminals 17, 18.

The switching circuit 15 is a circuit for performing switching between the image signals inputted from the input terminals so that the image signal from the selected input terminal is outputted to the display 12. The tuner circuit 13, the video decoder 14 and the first and the second HDMI input terminals 17, 18 are connected to the input of the switching circuit 15, whereas the display 12 is connected to the output of the switching circuit 15.

The television controller 11 outputs a switching control signal to the switching circuit 15 based on the selection operation by the user utilizing the input selection list, which will be described later. The switching circuit 15 switches the image signal to be outputted to the display 12 based on the switching control signal from the television controller 11.

The television set 1 is provided with a remote control 8 for enabling remote control of the television set. The above-described operation portion is provided with a communication unit for performing e.g. infrared communication with the remote control 8.

The television controller 11 has a function to cause the display screen of the display 12 to display a set-up menu for enabling the user to perform various settings. Specifically, as shown in FIG. 3, the set-up menu includes the input selection list for selecting the input source of the image to be displayed on the display 12.

Figure 3:
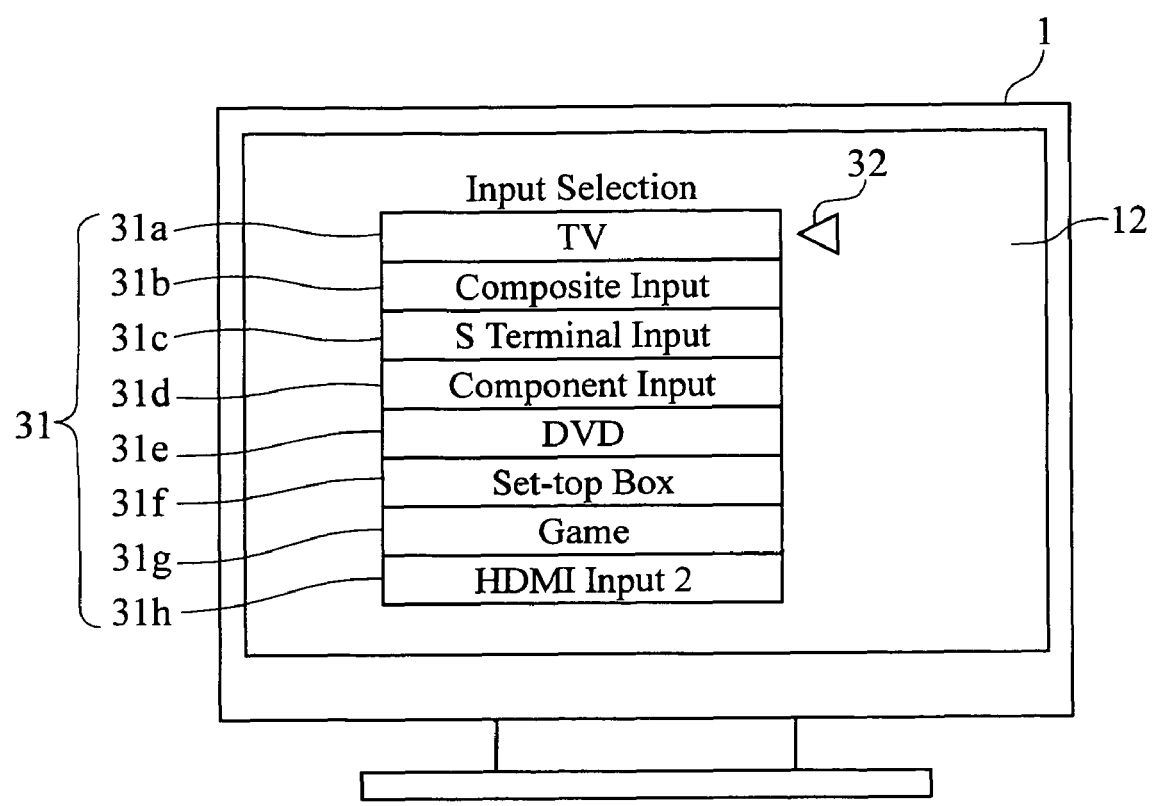
FIG. 3 shows an example of input selection list on a display.

Specifically, as shown in FIG. 3, the input selection list includes a number of frames 31 (31a-31h), and the name (e.g. name of the input terminal or AV equipment) of the input source is shown in each of the frames 31a-31h. A cursor 32 is displayed to point to any one of the frames 31a-31h. The cursor 32 can be moved up and down to other frames 31a-31h by the user's operation. When the user performs decisional operation with the cursor 32 pointing to one of the frames 31a-31h, the selected input source shown in that frame 31 is set, and the image signals or images transmitted from that input source are displayed on the display 12.

When the input selection list is displayed and any of the AV equipment (e.g. the DVD player 3, the set-top box 4 and the game console 5) connected to the AV amplifier 2 is selected, the television controller 11 transmits to the AV amplifier 2 a signal indicating the selection.

Referring again to FIG. 2, the AV amplifier 2 is the AV equipment constituting the core of the home theater system and conforming to HDMI. The AV amplifier 2 generally comprises an amplifier controller 21 and a switching circuit 22.

The amplifier controller 21 comprises a non-illustrated microcomputer for collectively controlling the AV amplifier 2. An operation portion (not shown) as a man-machine interface is connected to the amplifier controller 21. The amplifier controller 21 performs required data processing based on the inputting operation from the operation portion or on the control signals or data inputted from other AV equipment.

The amplifier controller 21 includes a first memory 21a and a second memory 21b. Similarly to the television set 1, the memory 21a stores EDID. The EDID may include information such as the physical address of the AV amplifier 2, the kind of resolution of the image data which can be processed at the AV amplifier 2. The EDID is read by the DVD player 3 and so on which is the upstream equipment.

The AV amplifier 2 is provided with a plurality of HDMI terminals as external input/output terminals. Specifically, the AV amplifier 2 is provided with a first HDMI input terminal 23 for connecting the DVD player 3, a second HDMI input terminal 24 for connecting the set-top box 4, and a third HDMI input terminal 25 for connecting e.g. the game console 5. The AV amplifier 2 may be provided with an HDMI input terminal other than the above. The AV amplifier 2 is further provided with an HDMI output terminal 26 for connecting the television set 1.

The memory 21b stores input terminal information about the first through the third HDMI terminals 23, 24, 25 in the form of an input terminal table shown as Table 2. Specifically, the input terminal table includes the number of input terminals (the number of HDMI input terminals), the name of AV equipment connected to each of the HDMI input terminals 23, 24, 25 (e.g. "DVD", "set-top box" and "game console"), and the input terminal numbers corresponding to the HDMI input terminals 23, 24, 25 (e.g. "1" for the DVD, "2" for the set-top box, "3" for the game console). The input terminal information is transmitted to the television set 1 as required and used for displaying the input selection list (see FIG. 3) at the television set 1.

TABLE 2

| Number of Input Terminals | Name of Equipment for Input Terminal | Input Terminal Number |
| --- | --- | --- |
| 3 | DVD | 1 |
|   | Set-top box | 2 |
|   | Game console | 3 |

The switching circuit 22 is a circuit for performing switching between the image signals inputted from the DVD player 3, the set-top box 4 and the game console 5 so that the image signal from the selected one of these devices is outputted to the HDMI output terminal 26. The first through the third HDMI input terminals 23, 24, 25 are connected to the input of the switching circuit 22, whereas the HDMI output terminal 26 is connected to the output of the switching circuit 22.

The amplifier controller 21 outputs a switching control signal to the switching circuit 22 based on a CEC command from the television set 1. The switching circuit 22 switches the image signal to be outputted to the HDMI output terminal 26 based on the switching control signal from the amplifier controller 21. Thus, the image signal of the AV equipment (e.g. the DVD player 3) selected on the side of the television set 1 is outputted to the HDMI output terminal 26.

The AV amplifier 2 is provided with a CEC bus 27 for connecting the CEC terminals of the first through the third HDMI input terminals 23, 24, 25 and the HDMI output terminal 26 to each other and connecting the terminals to the amplifier controller 21. Thus, the amplifier controller 21 recognizes the information of CEC at each of the HDMI input terminals 23, 24, 25 and the HDMI output terminal 26.

Though not illustrated, the amplifier controller 21 is connected to the HDMI output terminals 26 via hot plug signal lines. Based on the hot plug signal transmitted to the hot plug signal line, the amplifier controller 21 determines whether or not the television set 1 is in operation and EDID is ready to be read. The amplifier controller 21 may be connected to the first through the third HDMI input terminals 23, 24, 25 via hot signal lines. Owing to the hot plug signal lines, the amplifier controller 21 causes the DVD player 3 to detect whether or not the AV amplifier 2 is in operation and EDID is ready to be read.

The AV amplifier 2 is provided with a remote control 9 for remotely controlling the AV amplifier. The above-described operation portion is provided with a communication unit for performing e.g. infrared communication with the remote control 9.

The DVD player 3 is an apparatus for reproducing a DVD. With the structure shown in FIG. 2, the DVD player outputs e.g. image signals and audio signals to the AV amplifier 2 via the HDMI cable 7.

The set-top box 4 is an apparatus for receiving e.g. broadcasting signals of cable television services and outputs e.g. image signals and audio signals of the broadcasting to the AV amplifier 2.

In the game console 5, a game program stored in e.g. a CD-ROM is loaded, and a game proceeds based on the operation by the user using a controller (not shown). In proceeding the game, image signals and audio signals are outputted to the AV amplifier 2.

The DVD recorder 6 is AV equipment including e.g. a hard disk (not shown) and capable of recording the content of television broadcasting in the hard disk or dubbing the recorded content in a DVD. As shown in FIG. 2, the DVD recorder 6 is connected to the second HDMI input terminal 18 of the television set 1 via the HDMI cable 7.

Figure 4:
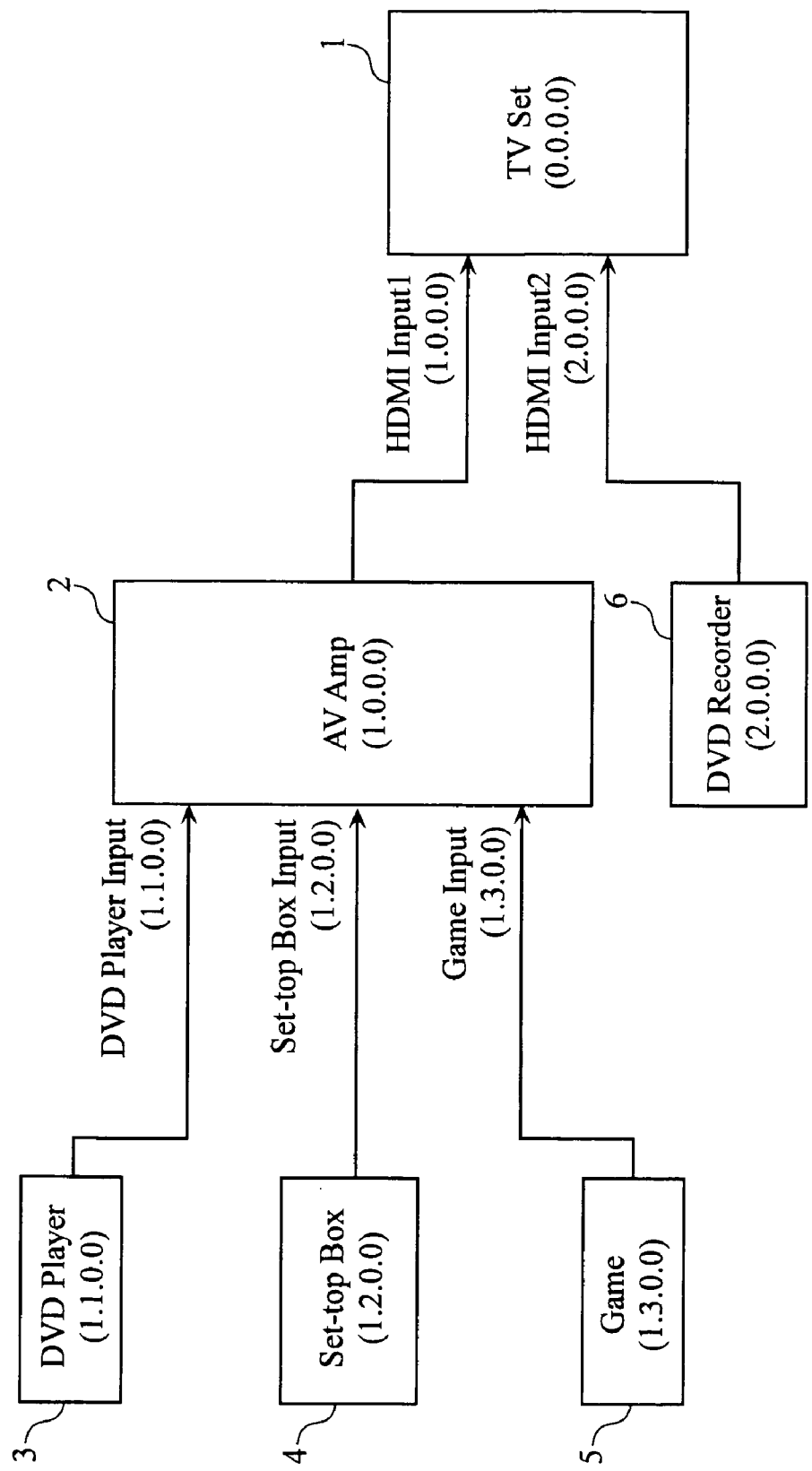
FIG. 4 schematically illustrates physical addresses in the image reproduction system.

Referring to FIG. 4, the physical address and logical address in the image reproduction system will be described below in relation to HDMI.

According to HDMI, a physical address is assigned to each of the AV equipment constituting the image reproduction system. The physical address comprises the arrangement of four numbers. The physical address represents the tree structure of the AV equipment constituting the image reproduction system and is used for determining the position of each AV equipment in the tree structure.

Specifically, the physical address of (0, 0, 0, 0) is assigned, by default, to the television set 1 which is the sink device of the image reproduction system. As shown in FIG. 2, to the television set 1, the AV amplifier 2 is connected via the first HDMI input terminal 17, and the DVD recorder 6 is connected via the second HDMI input terminal 18. In this case, the physical address of (1, 0, 0, 0) is assigned to the AV amplifier 2, whereas the physical address of (2, 0, 0, 0) is assigned to the DVD recorder 6. In these two physical addresses, the first number corresponds to the HDMI input terminal number of the television set 1.

Further, the AV amplifier 2 is connected to the DVD player 3 via the first HDMI input terminal 23, to the set-top box 4 via the second HDMI input terminal 24, and to the game console 5 via the third HDMI input terminal 25. In this case, the physical address of (1, 1, 0, 0) is assigned to the DVD player 3. The physical address of (1, 2, 0, 0) is assigned to the set-top box 4. The physical address of (1, 3, 0, 0) is assigned to the game console 5. In each of these three physical addresses, the second number corresponds to the HDMI input terminal number of the AV amplifier 2.

The physical addresses of the AV amplifier 2 and the DVD recorder 6 are stored in the EDID of the television set 1.

The sink device (television set 1) forms a physical address of a repeater device (AV amplifier 2) connected to an HDMI input terminal connected to the upstream side of the device correspondingly to the HDMI input terminal. The repeater device (AV amplifier 2) is capable of reading the EDID stored in the memory of a sink device located on the downstream side thereof to recognize its own physical address. For instance, the AV amplifier 2 reads the EDID stored in the memory 11a of the television set 1 located on the downstream side thereof to recognize its own physical address and stores the address in the memory 21a.

Based on its own physical address, the repeater device (AV amplifier 2) forms a physical address of a source device (e.g. DVD player 3) connected to an HDMI input terminal connected to the upstream side of the device correspondingly to the HDMI input terminal. The source device (e.g. DVD player 3) reads the EDID stored in the memory of a repeater device located on the downstream side thereof to recognize its own physical address. For instance, the DVD player 3 reads the EDID stored in the memory 21a of the AV amplifier 2 located on the downstream side thereof to recognize its own physical address and stores the address in a memory (not shown).

In addition to the physical address, a logical address is stored in the memory of each AV equipment. The logical address is specific information for each AV equipment of the image reproduction system. When each AV equipment performs data communication through the CEC signal lines 7b and the CEC buses 19, 27, the logical address is used for identifying the transmitter and the destination of the communication data. For instance, the logical address of the television set is set to "0", whereas the logical address of the AV amplifier 2 is set to "5".

The control process of the television set 1 and the amplifier 2 will be described below with reference to the flow charts shown in FIGS. 5-11. It is to be noted that the control process will be described on the assumption that the devices shown in FIG. 2 are connected physically.

Figure 5:
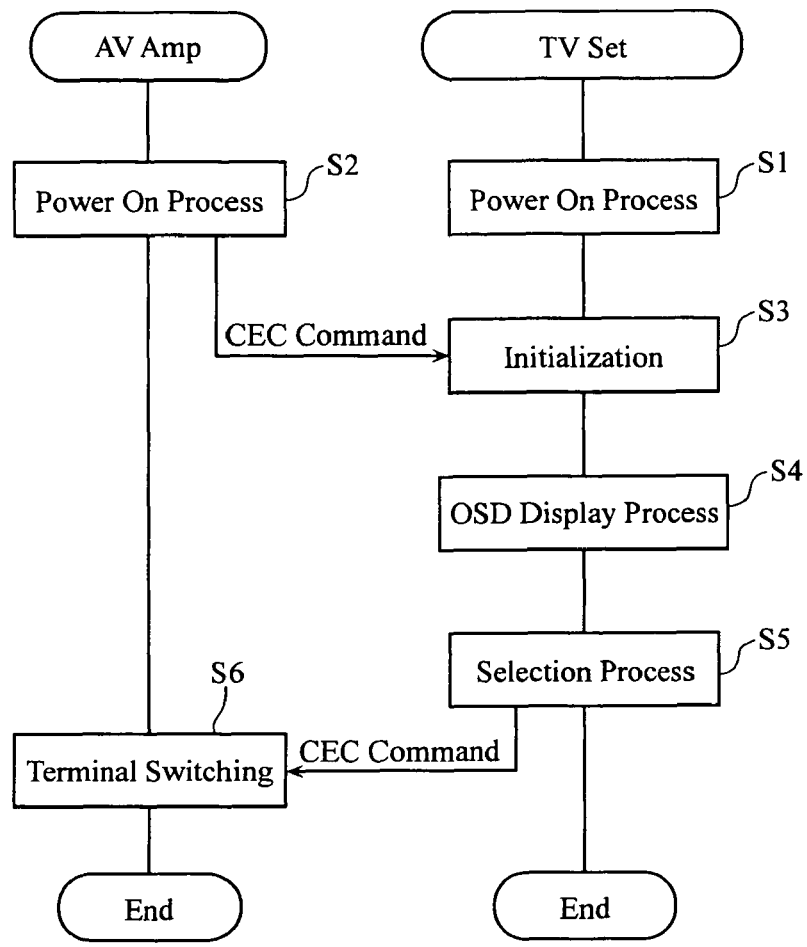
FIG. 5 is a flow chart schematically showing the control process in a television set and an AV amplifier.

FIG. 5 schematically shows the control process in the television set 1 and the AV amplifier 2. First, the process at the time of power on (or resetting) is performed at the television set 1 and the AV amplifier 2 (S1, S2).

In the process at the time of power on of the AV amplifier 2 (S2), a CEC command relating to the initialization is transmitted to the television set 1. In accordance with the transmitted CEC command, the initialization process is performed at the television set 1 (S3).

Then, with an input selection list being displayed by the user's operation, an OSD (on-screen display) process is performed at the television set 1 (S4). Then, a selection operation process for selecting an input source is performed (S5). In the selection operation process, a CEC command relating to the switching of an external input terminal is transmitted to the AV amplifier 2 as required. In response to the transmission of the CEC command, switching of the external input terminal in accordance with the transmitted CEC command is performed at the AV amplifier 2 (S6). Each of these processes (S1-S6) will be described below.

Figure 6:
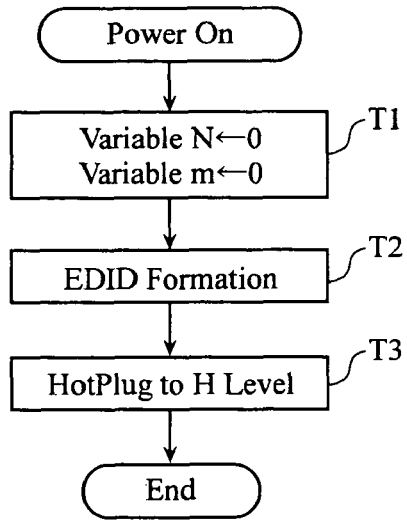
FIG. 6 is a flow chart showing the process at the time of power on of a television controller.

FIG. 6 is a flow chart of the process (S1) at the time of power on of the television controller 11. The same process as described below is performed when the television controller 11 is reset.

When the power is turned on, the television controller 11 sets the variable N and the variable m to "0" (T1). Herein, the variable N represents the number of input terminals of the AV amplifier 2, whereas the variable m is for storing the source number of the HDMI input terminal to which the AV amplifier 2 is connected. These variables N and m are successively stored in the memory 11a of the television controller 11.

The television controller 11 forms EDID relating to the physical address (T2). Specifically, based on its own physical address (0, 0, 0, 0), the television controller 11 forms the physical addresses for the first and the second HDMI terminals 17, 18 as EDID. For instance, the television controller forms a physical address (1, 0, 0, 0) for the first HDMI terminal 17 and a physical address (2, 0, 0, 0) for the second HDMI terminal 18. If the content of EDID is predetermined, as in an instance where the EDID is formed in manufacturing the television, the EDID formation step T2 is not performed.

Then, the television controller 11 changes the hot plug terminal of the first and the second HDMI input terminals 17, 18 from the L level to the H level (T3). This process enables the AV equipment such as the AV amplifier 2 and the DVD recorder 6 connected to the first and the second HDMI input terminals 17, 18 to detect that the television set 1 is turned on and EDID is ready to be read.

Figure 7:
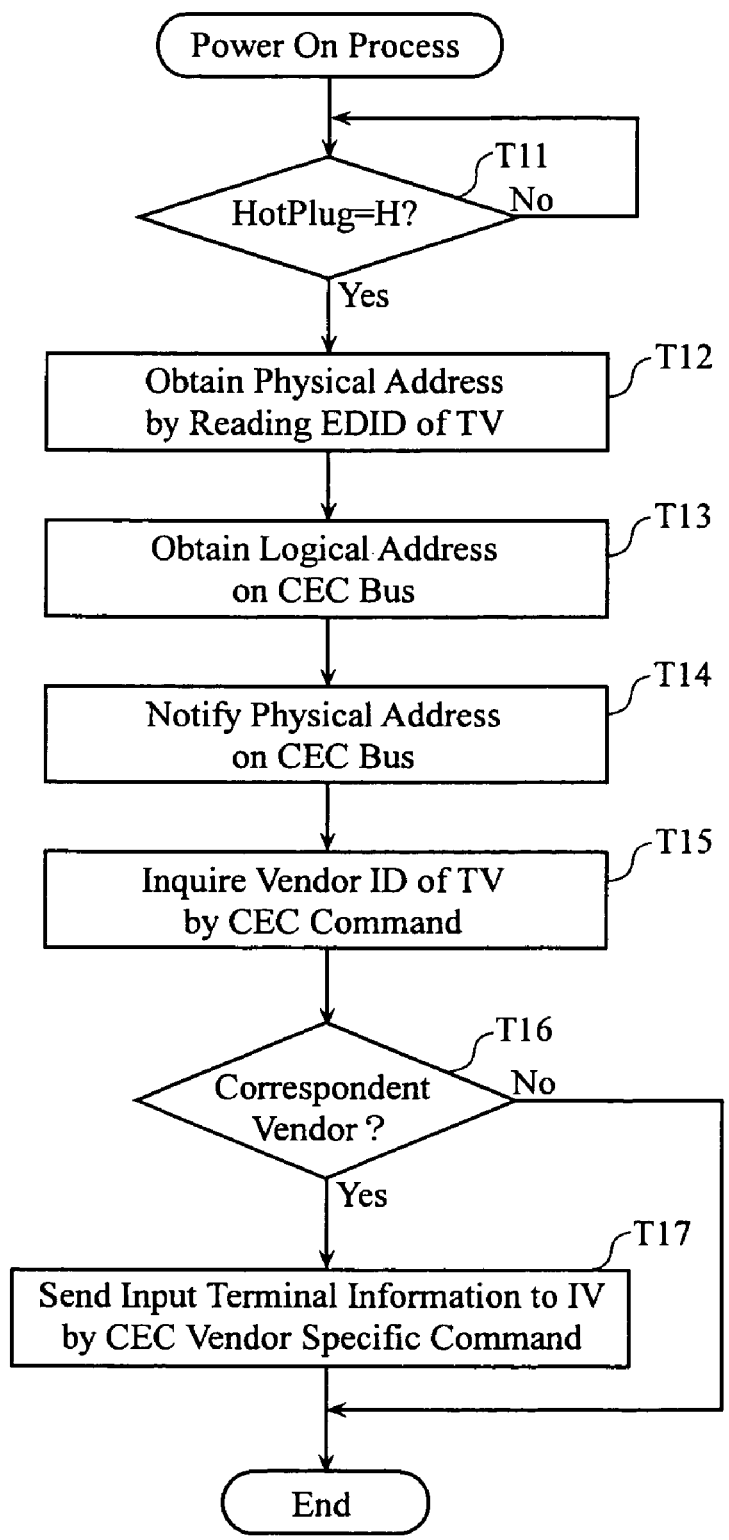
FIG. 7 is a flow chart showing the process at the time of power on of an amplifier controller.

FIG. 7 is a flow chart of the process (S2) at the time of power on of the amplifier controller 11. The same process to be described below is performed when the amplifier controller 21 is to be reset.

When the AV amplifier 2 is turned on, the amplifier controller 21 determines whether the hot plug terminal of the HDMI output terminal 26 is at the H level (T11). That is, when the television set 1 is turned on and EDID is ready to be read, the television set changes the hot plug terminal of its first and second HDMI input terminals 17, 18 from the L level to the H level. Since the television set 1 is connected to the HDMI output terminal 26 of the AV amplifier 2, whether the television set 1 is turned on and EDID is ready to be read is determined by detecting the level of the hot plug terminal of the HDMI output terminal 26.

When the hot plug terminal is at the H level (T11: YES), the amplifier controller 21 reads the EDID stored in the memory 11a of the television set 1 via the HDMI cable 7 and obtains its own physical address (T12). That is, the memory 11a of the television set 1 stores, as EDID, the physical addresses of the AV equipment (i.e., the AV amplifier 2 and the DVD recorder 6) connected to the first and the second HDMI input terminals 17, 18 of the television set 1. Thus, the amplifier controller 21 easily obtains its own physical address (1, 0, 0, 0).

Then, the amplifier controller 21 obtains its own logical address on the CEC buses 19, 27 (T13). That is, after obtaining the physical address, the amplifier controller 21 outputs a signal to the television set 1 to make its own logical address given on the CEC buses 19, 27. By this, the amplifier controller 21 obtains the logical address (e.g. "5").

Then, the amplifier controller 21 outputs its physical address and logical address by using a CEC command to notify the physical address and logical address to other AV equipment (T14). By receiving the CEC command, other AV equipment grasps the physical address and logical address of the AV equipment of the transmitter.

Then, by using a CEC command, the amplifier controller 21 asks the television set 1 the vendor ID (generally comprising an identification sign of the company that provides the AV equipment) of the television set 1 (T15).

The amplifier controller 21 determines whether or not the content of the reply from the television set 1 is the vendor to which the AV amplifier 2 corresponds (T16). For instance, AV devices provided by a same company can share a CEC command, and this process step is performed to check it.

When it is found from the reply from the television set 1 that the vendor corresponds to the vendor of the AV amplifier 2 (T16: YES), the amplifier controller 21 refers to the input terminal table shown as Table 2 and stored in the memory 21a and reads the input terminal information (the number of input terminals, the name of AV equipment connected to the input terminals and the input terminal numbers corresponding to the input terminals) to transmit the information to the television set 1 using a command specific to the vendor of the CEC (T17). By this process, the television set 1 grasps the number and names of the AV equipment connected to the AV amplifier 2.

When it is found from the reply from the television set 1 that the vendor does not correspond to the vendor of the AV amplifier 2 (T16: NO), the process is finished without transmitting the input terminal information. The process shown in FIG. 7 may be performed at the DVD recorder 6.

Figure 8:
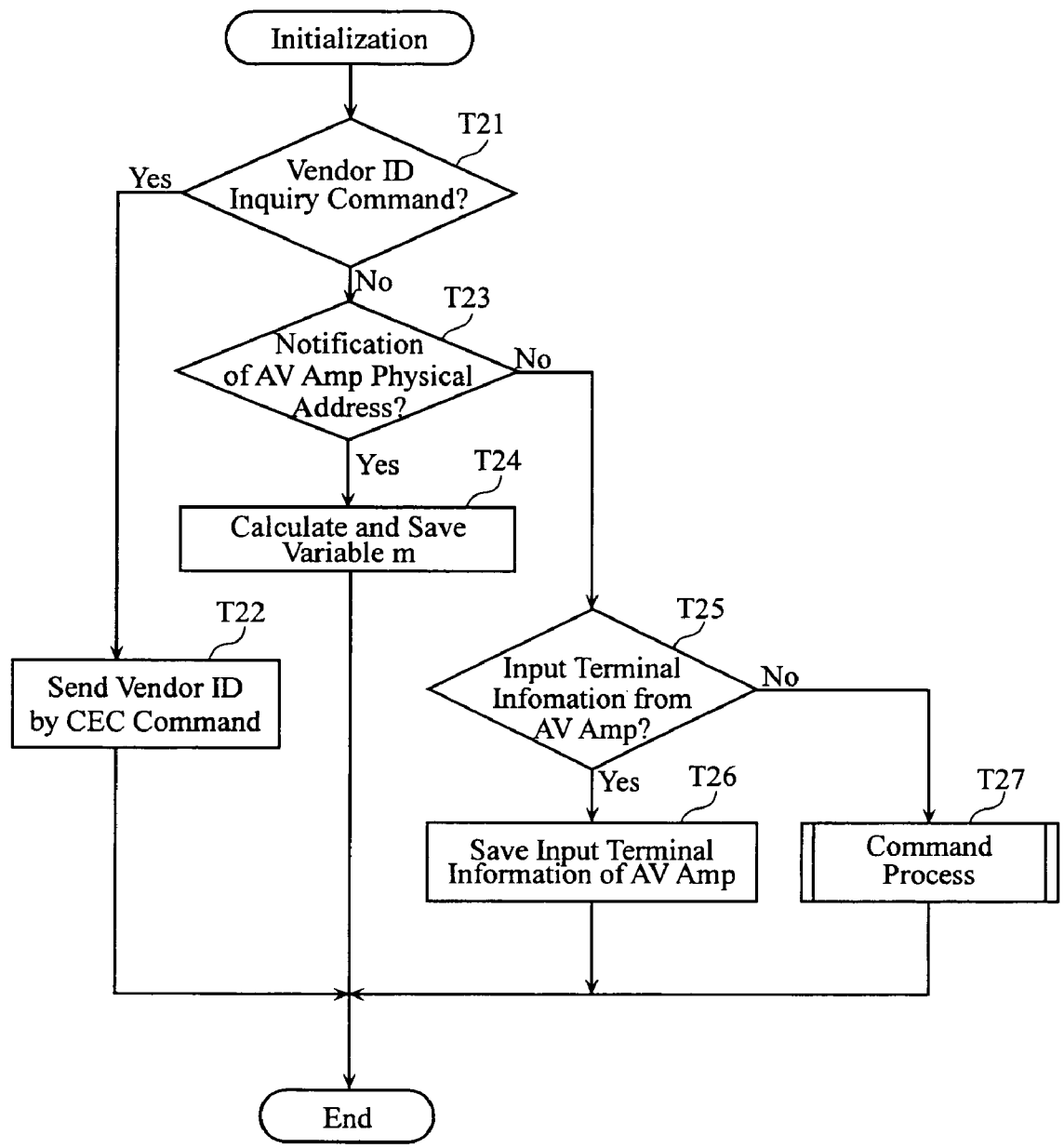
FIG. 8 is a flow chart showing the initialization process of the television controller.

FIG. 8 is a flow chart showing the initialization process (S3) of the television controller 11. Particularly, FIG. 8 shows the process to be performed in response to the CEC command transmitted in the process (S2) at the time of power on of the AV amplifier 2.

Upon receiving a CEC command from the AV amplifier 2, the television controller 11 determines whether or not the CEC command is a command for asking the vendor ID (T21). When the CEC command is a command for asking the vendor ID (T21: YES), the television controller 11 transmits its own vendor ID to the AV amplifier 2 using a CEC command (T22).

When the CEC command is not a command for asking the vendor ID in T21 (T21: NO), the television controller 11 determines whether or not the CEC command is the notification of the physical address of the AV amplifier 2 (T23). When the CEC command is the notification of the physical address of the AV amplifier 2 (T23: YES), the television controller calculates the variable m for storing the source number of the first HDMI input terminal 17 to which the AV amplifier 2 is connected and stores the variable in the memory 11a (T24).

Specifically, based on the notified physical address, which source number of the input source table of Table 1 the AV amplifier 2 having the physical address corresponds to is determined. For instance, when the physical address of the destination is (a, 0, 0, 0), the variable m is obtained by $m=5+(a-1)$, and the obtained variable m is stored in the memory 11a. More specifically, since the physical address of the AV amplifier 2 is (1, 0, 0, 0), the variable m is 5. By referring to the input source table, it is found that the input source of the HDMI input terminal 1 whose source number is 5 is the AV amplifier 2.

It is to be noted that the number "5" on the right side of the equation $m=5+(a-1)$ is determined depending on the structure of the input source for the television set 1 shown in FIG. 2. For instance, the "HDMI input 1" is on the fifth in Table 1, following the other input sources, i.e., "television broadcasting", "composite input" "S terminal input" and "component input", so that the number "5" is assigned to the HDMI input 1.

When the CEC command is not the notification of the physical address of the AV amplifier 2 in Step T23 (T23: NO), it is determined whether or not the CEC command is a command indicating the input terminal information (see input terminal table of Table 2) (T25). When the CEC command is a command indicating the input terminal information (T25: YES), the number of input terminals of the AV amplifier 2, names of the input terminals and the total number of the frames 31 of the input sources to be displayed in the input selection list (see FIG. 3) are stored in the memory 11a based on the transmitted input terminal information (T26).

Specifically, "3" is stored in the memory 11a as a variable representing the number of input terminals. Further, "DVD" is stored as the character string variable Name [1], "set-top box" is stored as the character string variable Name [2] and "game" is stored as the character string variable Name [3]. The variable n representing the total number of the frames 31 to be displayed in the input selection list is obtained by $n=6+N-1$ and stored. Since the variable N in this case is 3, the variable n is 8. Thus, 8 is stored in the memory 11a as the total number of the frames 31 to be displayed in the input selection list.

It is to be noted that the number "6" on the right side of the equation $n=6+N-1$ is determined depending on the structure of the input source for the television set 1 shown in FIG. 2. For instance, since the number of input sources for the television set 1 is six as shown in Table 1, 6 is used in the above-described equation.

In this way, in the television controller 11, the names of the input sources and the total number of the frames of the input sources to be displayed in the input selection list are determined based on the CEC command from the AV amplifier 2.

When the CEC command is not a command indicating the input terminal information in Step T25 (T25: NO), other processing of the CEC command is performed (T27).

Figure 9:
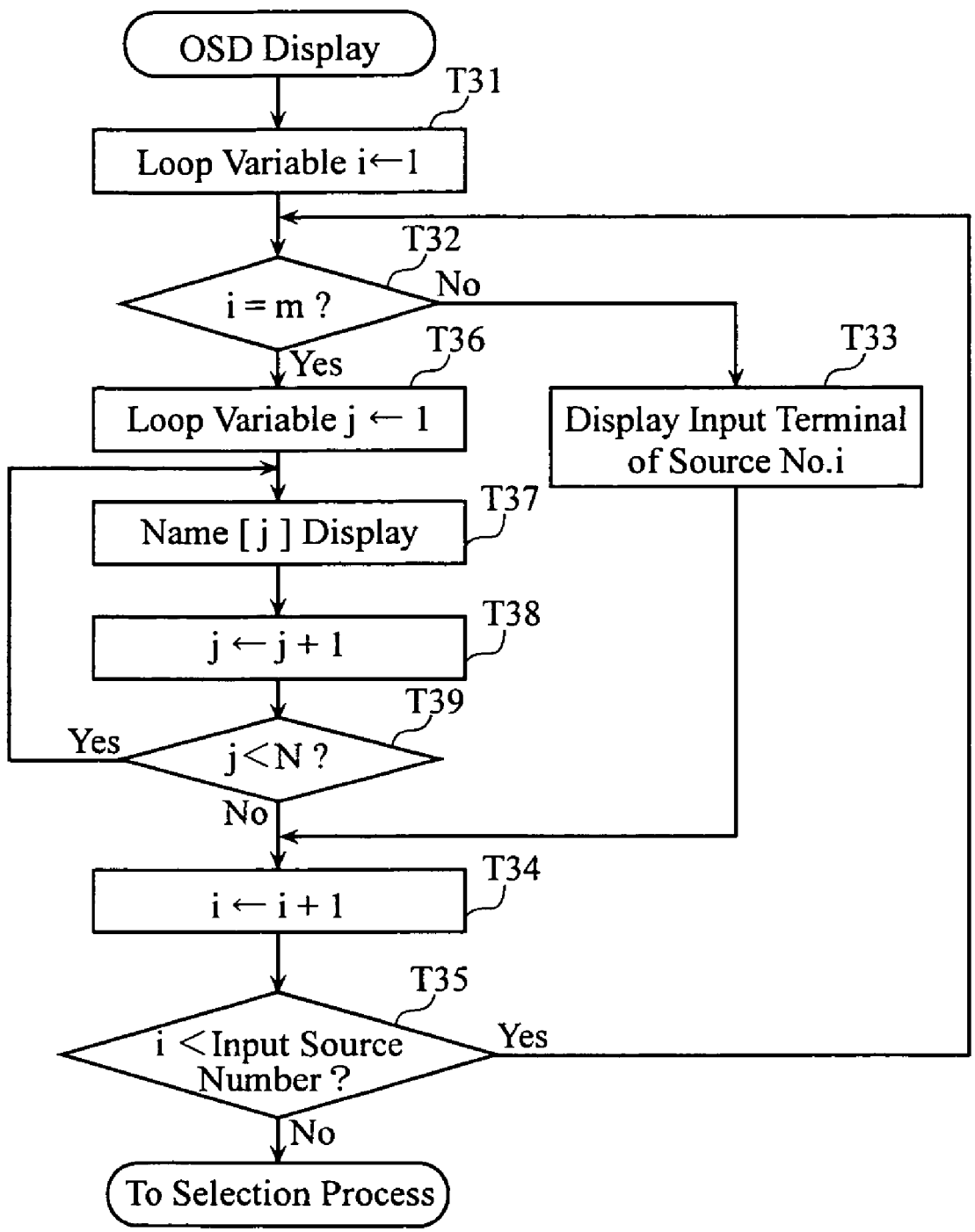
FIG. 9 is a flow chart showing the OSD process of the television controller.

FIG. 9 is a flow chart showing the OSD process (S4) of the television controller 11. That is, FIG. 9 shows the process in displaying the input selection list (see FIG. 3) on the display 12.

When the television controller 11 receives a command to display the input selection list on the display 12 by e.g. the operation of the remote control 8 by the user, the television controller 11 assigns "1" to the loop variable i and stores the loop variable i in the memory 11a (T31). Herein, the loop variable i is a variable used for the process for displaying the name of an input terminal in a frame 31.

Then, the television controller 11 determines whether or not the loop variable i is equal to the variable m (T32). For instance, when the variable m is "5", it is determined that the loop variable i and the variable m are not equal to each other (T32: NO). In this case, by referring to the input source table of Table 1, the name of the input terminal whose source number is "i" is displayed (T33). For instance, when i=1, the "television broadcasting" whose source number is 1 is displayed in the highest frame 31a.

Then, a new loop variable i is obtained by adding 1 to the above-described loop variable i, and the new loop variable is stored (T34). Then, it is determined whether or not the new loop variable i is smaller than the number of the input sources (T35). When the loop variable i is smaller than the number of input sources (T35: YES), the process returns to Step T32 for comparing the loop variable i and the variable m. In this case, since the new loop variable i is "2", the "composite input" whose source number is 2 is displayed in the next frame 31b.

Thereafter, the loop variable i is successively increased by one until the loop variable i becomes equal to the variable m, and the names of the input terminals whose source numbers are one through four are successively displayed in the frames 31a, 31b, 31c, 31d. Since the variable m is "5", i=m is satisfied in Step T32 when the loop variable i becomes "5" (T32: YES). In this case, the process proceeds to Step T36.

In Step T36, "1" is assigned to the loop variable j. Herein, the loop variable j is a variable used for the process for displaying the character string stored in the initialization process of FIG. 8.

The television controller 11 displays the character string "Name j" from the character strings stored in the memory 11a (T37). In this case, since the character strings Name[1] is "DVD", "DVD" is displayed in the next frame 31e.

Then, a new loop variable j is obtained by adding 1 to the above-described loop variable j, and the new loop variable is stored (T38). Then, it is determined whether or not the new loop variable j is smaller than the variable N (T39). When the loop variable j is smaller than the variable N (T39: YES), the process returns to Step T37. That is, the "set-top box" corresponding to the character string Name[2] is displayed in the next frame 31f.

Then, the loop variable j is increased by one, and the "game console" corresponding to the character string Name[3] is displayed in the frame 31g. Since the variable N is "3", the loop variable j becomes equal to the variable N in Step T39 (T39: NO) when the loop variable j becomes 3. Thus, the process proceeds to Step T34, and the loop variable i is increased by one.

That is, the "HDMI input 2" whose source number is "6" is displayed in the next frame 31h. When the loop variable i becomes equal to the number of input sources (T35: NO), the OSD process is finished and shifts to the selection operation process (S5).

Figure 13:
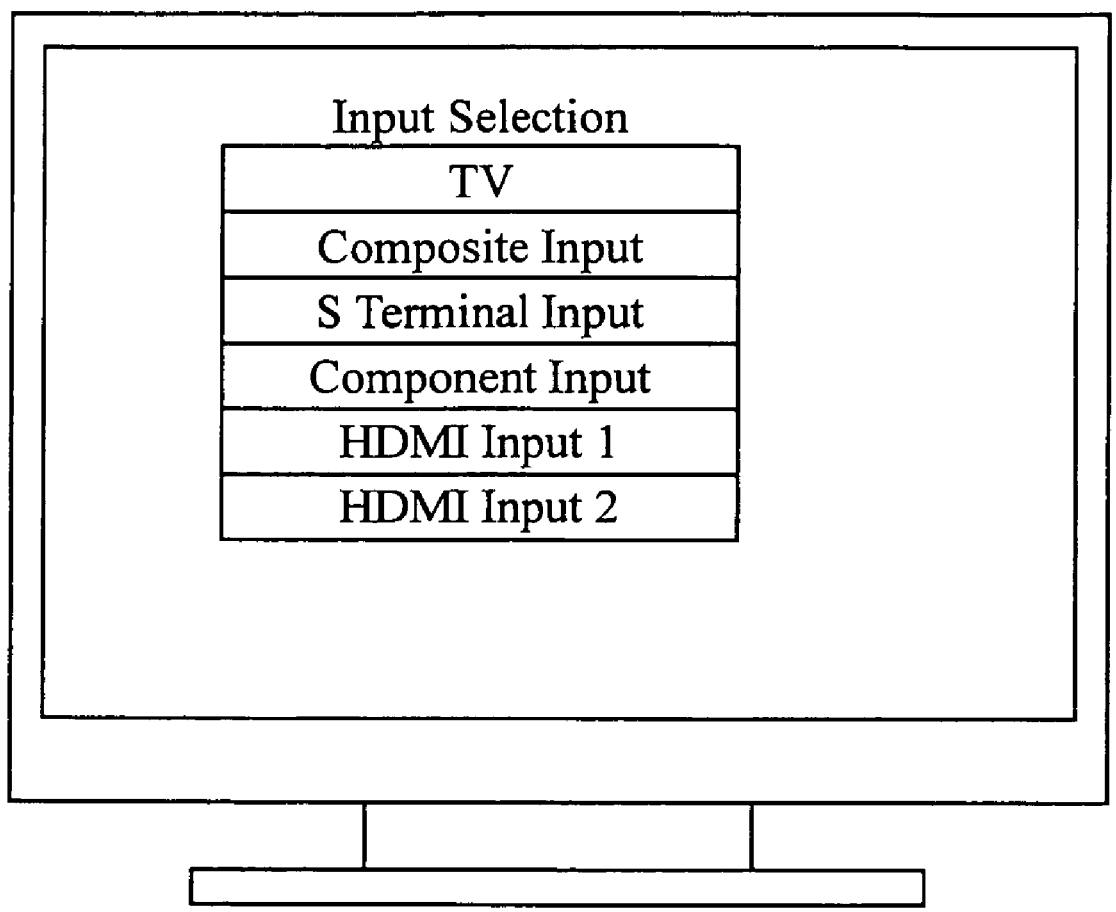
FIG. 13 shows an example of input selection list of a conventional television set.

Conventionally, as shown in FIG. 13, only the names of the external input terminals provided at the television set 1 are displayed, and the names of the AV equipment connected to the AV amplifier 2 are not displayed. Thus, to select an input source using the input selection list, it has been necessary to first select "HDMI input 1" at the television set 1 and then select the desired AV equipment at the AV amplifier 2.

According to this embodiment, however, the names of all the AV equipment connected to the AV amplifier 2 are displayed in the input selection list. Thus, the user can select the desired AV equipment only by the operation at the television set 1.

Figure 10:
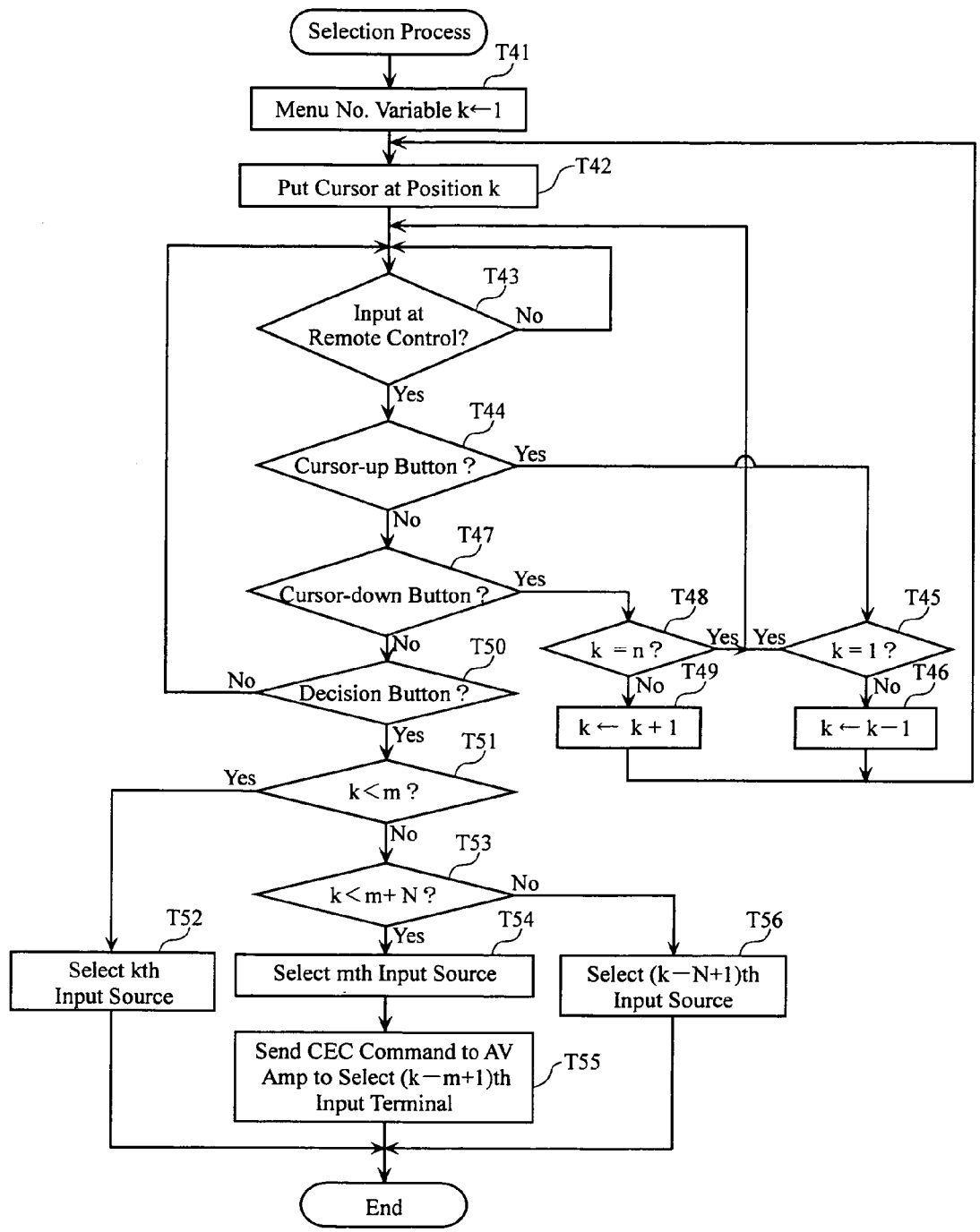
FIG. 10 is a flow chart showing the selection operation process of the television controller.

FIG. 10 is a flow chart showing the selection operation process (S5) of the television controller 11. That is, the flow chart of FIG. 10 shows the process when the input source is selected by the user's inputting operation. When the selection operation process is to be performed, the names of input sources, the corresponding menu numbers and the corresponding frame positions in the input selection list are stored in the memory 11a in the form of a menu number table shown as Table 3.

TABLE 3

| Input Source Name | Menu Number k | Frame Position |
| --- | --- | --- |
| Television Broadcasting | 1 | 31a |
| Composite Input | 2 | 31b |
| S terminal Input | 3 | 31c |
| Component Input | 4 | 31d |
| DVD | 5 | 31e |
| Set-top box | 6 | 31f |
| Game Console | 7 | 31g |
| HDMI Input 2 | 8 | 31h |

The menu number table includes the names of all the input sources to be displayed in the input selection list in the OSD process shown in the flow chart of FIG. 9 and is formed in the OSD process described above with reference to FIG. 9.

As shown in FIG. 10, the television controller 11 assigns "1" to the menu number variable k (T41). Herein, the menu number k is a variable used for designating any of the frames 31 of the input selection list in selecting and setting the input source.

Then, the television controller 11 displays the cursor 32 at the position of the frame 31 in the input selection list which corresponds to the menu number variable k. In this case, since the menu number variable k is "1", the cursor 32 is displayed to point to the frame 31a, as shown in FIG. 3.

Then, it is determined whether or not the user's inputting operation is performed with respect to the remote control 8 (T43). Though not illustrated, the remote control 8 is provided with a cursor-up button for moving the cursor 32 upward in the screen, a cursor-down button for moving the cursor 32 downward in the screen, and a decision button for deciding the inputting operation and so on.

When the user's inputting operation is detected (T43: YES), it is determined whether or not the inputting operation is by the cursor-up button (T44). When the inputting operation is by the cursor-up button (T44: YES), whether or not the menu number variable k is "1" is determined (T45). When the menu number variable k is "1" (T43: YES), the process returns to Step T43 for checking whether or not the user's inputting operation is performed. When the menu number variable k is not "1" (T43: NO), "1" is subtracted from the menu number variable k to set the result as the new menu number variable k (T46), and Step T42 is performed to display the cursor 32 at the position of the frame 31 corresponding to the menu number variable k.

Specifically, according to the above-described process, in the case where the cursor-up button is operated when the cursor 32 is pointing to the highest frame 31a, the operation is ignored, and the next operation is waited for. In the case where the cursor-up button is operated when the cursor 32 is pointing to any frame other than the highest frame, the cursor moves up to point to a frame 31 immediately above that frame 31.

When the inputting operation by the user is not by the cursor-up button (T44: NO), it is determined whether or not the inputting operation is by the cursor-down button (T47). When the inputting operation is by the cursor-down button (T47: YES), whether or not the menu number variable k is equal to the variable n (representing the number of frames 31) (T48). When the menu number variable k is equal to the variable n (e.g. "8") (T48: YES), the process returns to Step T43 to check whether or not the user's inputting operation is performed. When the menu number variable k is not equal to the variable n (T48: NO), 1 is added to the menu number variable k to set the result as the new menu number variable k (T49), and Step T42 is performed to display the cursor 32 at the position of the frame 31 of the menu number variable k.

Specifically, according to the above-described process, in the case where the cursor-down button is operated when the cursor 32 is pointing to any frame other than the lowest frame, the cursor moves to point to a frame 31 immediately under that frame 31. In the case where the cursor-down button is operated when the cursor 32 is pointing to the lowest frame 31h, the operation is ignored because the lower frame does not exist, and the next operation is waited for.

When the inputting operation by the user is not by the cursor-down button in Step T47 (T47: NO), it is determined whether or not the inputting operation is by the decision button (T50). When the inputting operation is not by the decision button (T50: NO), the process returns to Step T43. When the inputting operation is by the decision button (T50: YES), it is determined whether or not the menu number variable k is smaller than the variable m ("5" in this case) (T51). When the menu number variable k is smaller than the variable m (T51: YES), the "k-th" input source is selected (T52).

For instance, when the menu number variable k is "1", the "television broadcasting" is selected as the input source. In this case, the television controller 11 outputs a switching control signal to the switching circuit 15 to cause the input of the switching circuit 15 to be connected to the tuner circuit 13. In accordance with this signal, switching is performed at the switching circuit 15, and image signals of the television broadcasting are outputted from the tuner circuit 13 to the display 12.

When the menu number variable k is "4", the "component input" is selected as the input source. In this case, the television controller 11 outputs a switching control signal to the switching circuit 15 to cause the input of the switching circuit 15 to be connected to the video decoder 1. In accordance with this signal, switching is performed at the switching circuit 15, and image signals of e.g. VHS equipment inputted from the component terminal 16c are outputted to the display 12.

When the menu number variable k is not smaller than the variable m in Step T51 (T51: NO), it is determined whether or not the menu number variable k is smaller than the sum of the variable m and the variable N ("3" in this case) (T53). When the menu number variable k is smaller than the sum of the variable m and the variable N (T53: YES), the "m-th" input source is selected (T54). That is, any of the "DVD" corresponding to the menu number variable 5, the "set-top box" corresponding to the menu number variable 6 and the "game console" corresponding to the menu number variable 7 is selected.

For instance, when the 5-th (m) input source (DVD) is selected, the television controller 11 outputs a switching control signal to the switching circuit 15 to cause the input of the switching circuit 15 to be connected to the first HDMI input terminal 17. In accordance with this signal, switching is performed at the switching circuit 15, and image signals from the AV amplifier 2 inputted through the first HDMI input terminal 17 are outputted to the display 12.

Then, the television controller 11 transmits a CEC command to the AV amplifier 2 to instruct the selection of the (k−m+1)th input terminal of the AV amplifier 2 (T55). Thus, any of the DVD player 3, the set-top box 4 and the game console 5 connected to the first through the third HDMI input terminals 23, 24, 25 of the AV amplifier 2 is selected.

When the menu number variable k is larger than the sum of the variable m and the variable N in Step S53 (S53: NO), the (k−m+1)th input source is selected (T56). That is, the "HDMI input 2" which is the input source corresponding to the menu number variable 8 is selected. In this case, the television controller 11 outputs a switching control signal to the switching circuit 15 to cause the input of the switching circuit 15 to be connected to the second HDMI input terminal 18. In accordance with this signal, switching is performed at the switching circuit 15, and image signals from the DVD recorder 6 inputted through the second HDMI input terminal 18 are outputted to the display 12.

In this way, any of the input sources displayed in the input selection list is selected by the user's inputting operation, and the switching circuit 15 is switched in accordance with the selected input source.

Figure 11:
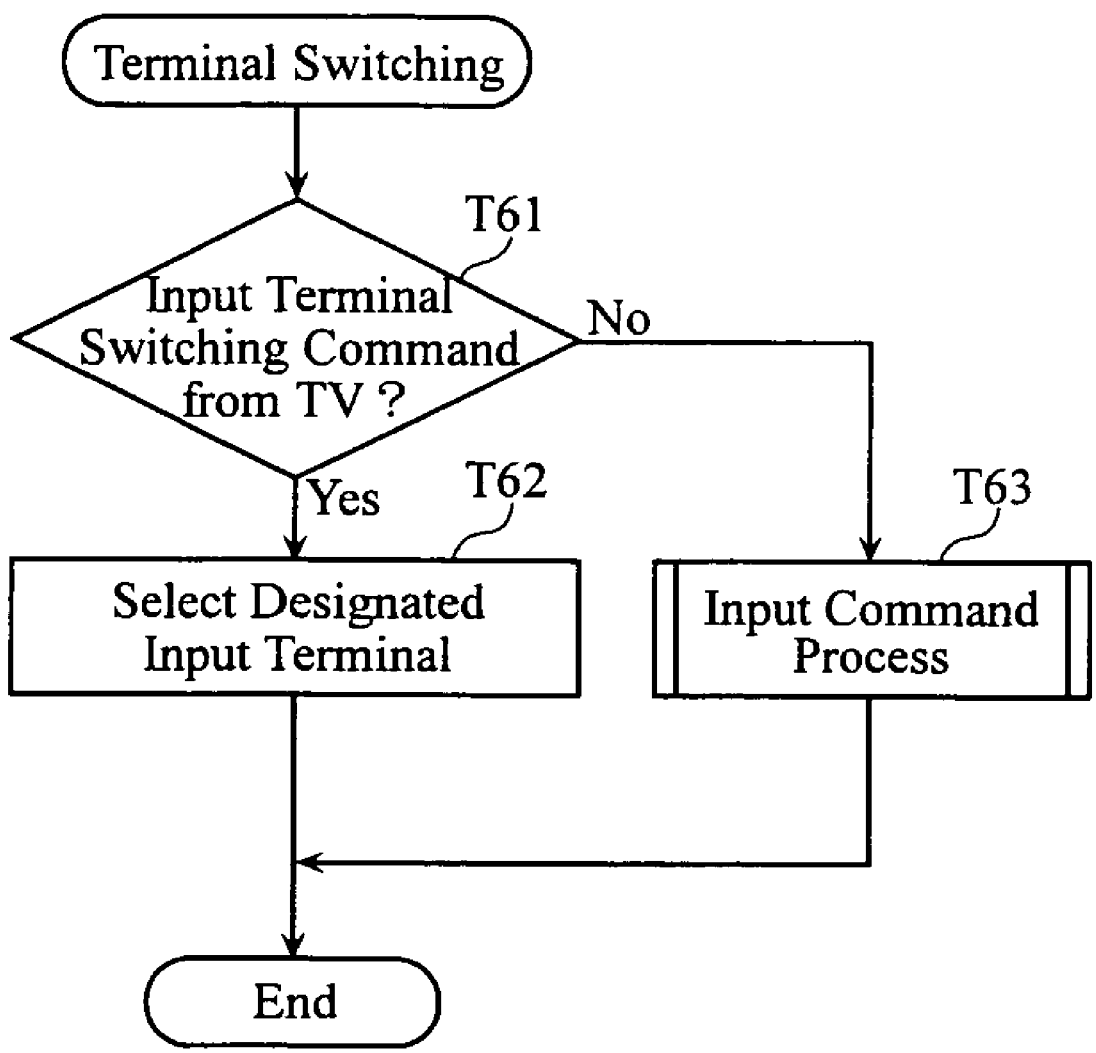
FIG. 11 is a flow chart showing the switching process of external input terminals of the amplifier controller.

FIG. 11 is a flow chart showing the switching process (S6) of the external input terminals of the amplifier controller 21. That is, the flow chart of FIG. 11 shows the switching process to be performed in accordance with a CEC command transmitted from the television set 1.

On receiving a CEC command from the television set 1, the amplifier controller 21 determines whether or not the CEC command is a command relating to the switching of external input terminals (T61). When the received CEC command is a command relating to the switching of external input terminals (T61: YES), the amplifier controller 21 switches the input of the switching circuit 22 to the selected external input terminal (T62).

For instance, when the 5th (m) input source (DVD) is selected in Step T54 of the flow chart of FIG. 10, the amplifier controller 21 outputs a switching control signal to the switching circuit 22 to cause the input of the switching circuit 22 to be connected to the first HDMI input terminal 23 (see input terminal table of Table 2) which is the 1st (k−m+1) external input terminal of the AV amplifier 2. In accordance with this signal, switching is performed at the switching circuit 22, and image signals from the DVD player 3 inputted through the first HDMI input terminal 23 are outputted to the HDMI output terminal 26.

The image signals of the DVD player 3 outputted from the HDMI output terminal 26 are inputted into the first HDMI input terminal 17 of the television set 1 via the HDMI cable 7. In the television set 1, the first HDMI input terminal 17 is connected to the display 12 by the switching operation of the switching circuit 15. Thus, the image signals of the DVD player 3 inputted into the first HDMI input terminal 17 are outputted to the display 12.

When the received CEC command is not a command relating to the switching of external input terminals in step T61 (T61: NO), other processing of the CEC command is performed (T63).

In this way, when the operation to select an input source is performed on the side of the television set 1 using the input selection list, its content is transmitted to the AV amplifier 2. The image signals of the input source selected on the side of the AV amplifier 2 are transmitted to the television set 1 to be outputted to the display 12. Thus, the user does not need to perform the selection operation using the remote control 9 of the AV amplifier 2. Thus, the image reproduction system is easy to operate and convenient.

Figure 12:
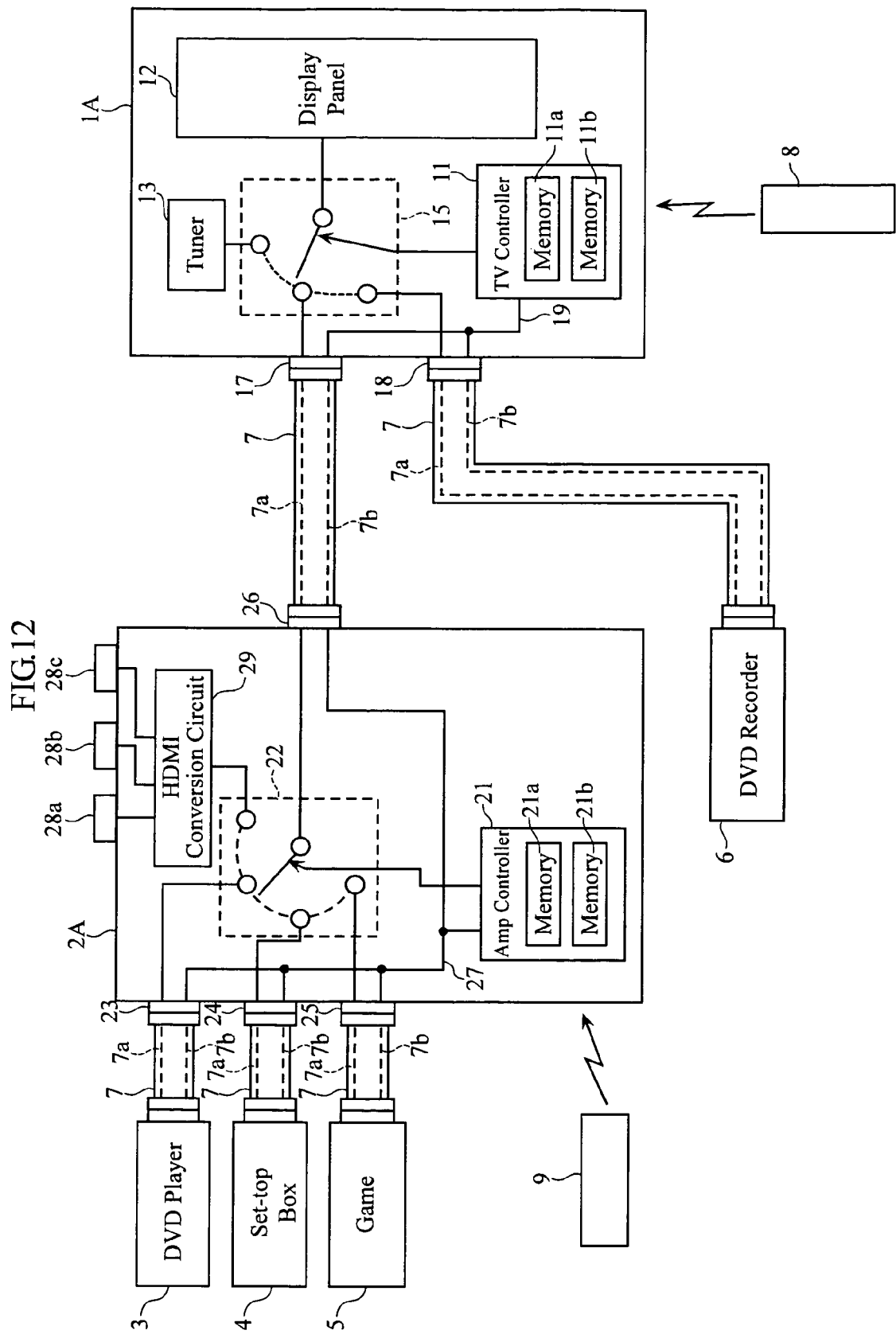
FIG. 12 shows the structure of a variation of the image reproduction system.

FIG. 12 shows the structure of a variation of the image reproduction system. As shown in the figure, the AV amplifier 2A is provided with a composite terminal 28a, an S terminal 28b and a component terminal 28c as external input terminals for connection to e.g. a VHS equipment. An HDMI conversion circuit 29 is connected to the composite terminal 28a, the S terminal 28b and the component terminal 28c. The HDMI conversion circuits 29 converts the image signals as analog signals outputted from e.g. the VHS equipment into signals which can be processed in accordance with HDMI. The output of the HDMI conversion circuit 29 is connected to the switching circuit 22.

Unlike the television set shown in FIG. 2, the composite terminal 16a, the S terminal 16b, the component terminal 16c and the video decoder 14 and so on are eliminated from the television set 1A. The structures of other portions are generally the same as those shown in FIG. 2.

With the above-described structure, the AV amplifier 2A can transmit input terminal information from the composite terminal 28a, the S terminal 28b and the component terminal 28c to the television set 1 in addition to the input terminal information of the first through the third HDMI input terminals 23, 24, 25. Based on the input terminal information from the AV amplifier 2A, the input selection list is displayed on the display 12 of the television set 1A. (In this case, the input selection list similar to that shown in FIG. 3 is displayed.) When an input source connected to the AV amplifier 2A is selected in the input selection list, switching is performed at the switching circuit 22 of the AV amplifier 2A, so that the image signals from the selected input source are outputted to the display 12 of the television set 1.

In this way, the same advantages as those of the image reproduction system shown in FIG. 2 can be enjoyed even when the AV amplifier 2A is provided with an external input terminal which does not conform to HDMI.

As seen from the above explanation, the present invention provides an image reproduction system that may comprise a display device (e.g. TV set 1), a signal processor (e.g. AV amplifier 2) connected to the display device, and a plurality of image output devices (e.g. DVD player 3, set-top box 4, game console 5, etc.) connected to the signal processor. The display device may include: a display panel; a list display controller for causing the display panel to display a list of image signal output sources; an operation input section for enabling a user to select one of the image signal output sources displayed on the display panel; and a display output section for outputting an image signal of the selected one of the image signal output sources to the display panel. The signal processor, connected to the display device, may include a plurality of specific input terminals and a signal output section for outputting image signals inputted through the specific input terminals to the display device. Each of the image output devices, connected to one of the specific input terminals of the signal processor, outputs image signals to the signal processor. The display device may further include: a display change section for adding ID information of the respective image output devices to the list displayed on the display panel; and a selection information transmitting section for transmitting selection information to the signal processor when one of the image output devices is selected by the operation input section. The signal processor may further include: a device information transmitting section for transmitting ID information of the respective image output devices to the display device; and a switching section for outputting image signals from the selected one of the image output devices to the display device upon receiving the selection information transmitted by the selection information transmitting section.

The function of the signal processor (or AV amplifier) is described in detail in this specification with reference to the flow charts shown in FIGS. 5, 7 and 11. Likewise, the function of the display device (or TV set) is described in detail with reference to the flow charts shown in FIGS. 5, 6 and 8-10. The functions of such a signal processor and a display device can be executed by a computer that operates on an appropriate computer program. In particular, the function of the signal output section, the device information transmitting section, and the switching section of the above signal processor may be executed by a computer that operates on an appropriate computer program. Likewise, the function of the list display controller, the operation input section, the display output section, the display change section, and the selection information transmitting section of the above display device may be executed by a computer that operates on an appropriate computer program. These programs, encoded and stored in a computer readable format, may be stored in a computer readable storage medium such as floppy disks, compact discs, and other removable media. It is also possible to provide these programs in the form of a computer program product which may be transmitted through appropriate networks, the typical one of which is the Internet.

The present invention is not limited to the foregoing embodiments. For instance, although an AV amplifier and a television set are described as examples of AV equipment for which image signals are to be switched, the present invention is not limited thereto, and other AV equipment may be employed. Further, the names of equipment for input terminals in the input terminal table of Table 2 may be changed to the actual name of the equipment obtained from the source equipment connected to each input terminal.

The invention claimed is:

1. An image reproduction system comprising a display device, a signal processor, and a plurality of image output devices, the display device including:
   a display panel;
   a list display controller for causing the display panel to display a list of image signal output sources;
   an operation input section for enabling a user to select one of the image signal output sources displayed on the display panel;
   a display output section for outputting an image signal of the selected one of the image signal output sources to the display panel; and
   a plurality of input terminals including a first input terminal of the plurality of input terminals being directly connected to the signal processor, and a second input terminal of the plurality of input terminals being directly connected to one of the plurality of image output devices,
   the signal processor being connected to the first input terminal of the display device and including a plurality of specific input terminals and a signal output section for outputting image signals inputted through the specific input terminals to the display device;
   at least one of the plurality of image output devices being connected to one of the specific input terminals of the signal processor so that ID information of the image output device can be transmitted or received to output image signals to the signal processor, and at least another of the plurality of image output devices being connected to one of the plurality of input terminals of the display device to output image signals to the display device;

wherein the display device further includes:

a display change section for adding ID information of the respective image output devices connected to the signal processor and input terminal information of said another of the input terminals to the list displayed on the display panel; and a selection information transmitting section for transmitting selection information to the signal processor when one of the image output devices is selected by the operation input section;

wherein the signal processor further includes:

a device information transmitting section for transmitting ID information of the respective connected image output devices to the display device; and a switching section for outputting image signals from the selected one of the image output devices to the display device upon receiving the selection information transmitted by the selection information transmitting section.

2. The image reproduction system according to claim 1, further comprising HDMI cables for connecting between the display device and the signal processor and for connecting between the signal processor and the respective image output devices, wherein the display device, the signal processor and the image output devices conform to HDMI.

3. The image reproduction system according to claim 2, wherein the selection information transmitted by the selection information transmitting section and the ID information of the image output devices transmitted by the device information transmitting section are sent via CEC control lines included in the HDMI cables.

4. A signal processor used for an image reproduction system that includes a plurality of image output devices and a display device for displaying a list of ID information of the image output devices, the signal processor being connected to the display device and each of the image output devices so that the ID information can be transmitted or received, the signal processor comprising:

specific input terminals being capable of transmitting and receiving the ID information;

an additional input terminal being incapable of transmitting and receiving the ID information;

a signal output section for outputting image signals inputted through the specific input terminals or the additional input terminal to the display device;

a device information transmitting section for transmitting the ID information of the respective image output devices connected to the specific input terminals and input terminal information of the additional input terminal to the display device; and a switching section for outputting image signals from a selected one of the image output devices to the display device upon receiving image output device selection information transmitted from the display device.

5. A display device used for a image reproduction system that includes a plurality of image output devices and a signal processor, the display device being connected to the signal processor, the display device comprising:

a display panel;

a list display controller for causing the display panel to display a list of image signal output sources;

an operation input section for enabling a user to select one of the image signal output sources displayed on the display panel;

a display output section for outputting an image signal of the selected one of the image signal output sources to the display panel;

a plurality of input terminals including: one input terminal to which the signal processor is directly connected; and another input terminal to which one of the image output devices is directly connected;

a display change section for adding ID information of the respective image output devices connected to the image processor and input terminal information of said another input terminal to the list displayed on the display panel; and a selection information transmitting section for transmitting selection information to the signal processor when one of the image output devices is selected by the operation input section, wherein each of the image output devices is connected so that ID information of the image output device can be transmitted to or received from the input terminals or the signal processor device.

6. A tangible computer medium encoded with computer executable instructions, the computer executable instructions causing a computer to execute as the list display controller, the operation input section, the display output section, the display change section, and the selection information transmitting section of the display device set forth in claim 5.

* * * * *